(12) United States Patent
Millett et al.

(10) Patent No.: US 8,745,035 B1
(45) Date of Patent: *Jun. 3, 2014

(54) MULTISTAGE PIPELINE FOR FEEDING JOINED TABLES TO A SEARCH SYSTEM

(75) Inventors: Ronald P. Millett, Cedar Hills, UT (US); Moray B. King, Orem, UT (US)

(73) Assignee: Perfect Search Corporation, Provo, UT (US)

( * ) Notice: Subject to any disclaimer, the term of this patent is extended or adjusted under 35 U.S.C. 154(b) by 151 days.

This patent is subject to a terminal disclaimer.

(21) Appl. No.: 13/481,382

(22) Filed: May 25, 2012

Related U.S. Application Data

(63) Continuation of application No. 13/029,977, filed on Feb. 17, 2011, now Pat. No. 8,190,597, which is a continuation of application No. 12/974,915, filed on Dec. 21, 2010, now abandoned.

(60) Provisional application No. 61/288,776, filed on Dec. 21, 2009.

(51) Int. Cl.
*G06F 7/00* (2006.01)
*G06F 17/30* (2006.01)

(52) U.S. Cl.
USPC ............................................. 707/716; 707/756

(58) Field of Classification Search
CPC ............. G06F 17/30; G06F 17/30067; G06F 17/30312; G06F 17/30427; G06F 17/30569; G06F 17/30592

See application file for complete search history.

(56) References Cited

U.S. PATENT DOCUMENTS

| | | | | |
|---|---|---|---|---|
| 5,467,471 A * | 11/1995 | Bader | ................................. | 1/1 |
| 5,778,377 A * | 7/1998 | Marlin et al. | ........................ | 1/1 |
| 7,058,639 B1 * | 6/2006 | Chatterjee et al. | .................... | 1/1 |
| 7,571,182 B1 * | 8/2009 | Eddy | .................................... | 1/1 |
| 8,176,088 B2 * | 5/2012 | Rjaibi et al. | .................. | 707/802 |
| 2005/0108635 A1 * | 5/2005 | Shimada | ...................... | 715/518 |
| 2008/0208879 A1 * | 8/2008 | Schnelle et al. | .............. | 707/100 |

* cited by examiner

*Primary Examiner* — Alex Gofman
*Assistant Examiner* — Tuan A Pham
(74) *Attorney, Agent, or Firm* — Workman Nydegger (57) ABSTRACT

Flattening a relational database. A method includes accessing a first database table. A first entry value is identified in a first entry from the first database table. The first entry value represents a plurality of entry values of corresponding entries in a second database table. An array is created that includes one or more representations of the plurality of entry values. At least a portion of the first database table is converted to one or more hierarchical record documents, with columns of the first database table represented at a first hierarchical level and values in entries in the columns represented at a second hierarchical level below the first hierarchical level for a corresponding column. Converting the first database table to one or more hierarchical record documents includes substituting the array in a hierarchical record document for each entry in the plurality of entries having the first entry value.

17 Claims, 5 Drawing Sheets

| gameID | number | date | home | opponent | win | ot | team-score | opp-score | wins | losses | starting lineup |
|---|---|---|---|---|---|---|---|---|---|---|---|
| 602 | 1 | Wed-2008-10-29 | True | Denver Nuggets | True | | 98 | 94 | 1 | 0 | 281 |
| 605 | 3 | Mon-2008-11-03 | False | Los Angeles Clippers | True | | 89 | 73 | 3 | 0 | 281 |
| 608 | 4 | Wed-2008-11-05 | True | Portland Trail Blazers | True | | 103 | 96 | 4 | 0 | 281 |
| 619 | 12 | Wed-2008-11-19 | True | Milwaukee Bucks | True | | 105 | 94 | 8 | 4 | 281 |
| 622 | 14 | Sat-2008-11-22 | False | Memphis Grizzlies | True | | 103 | 94 | 9 | 5 | 312 |
| 627 | 16 | Wed-2008-11-26 | True | Memphis Grizzlies | True | | 117 | 100 | 10 | 6 | 254 |
| 635 | 20 | Wed-2008-12-03 | True | Miami Heat | True | | 89 | 93 | 12 | 8 | 254 |
| 636 | 21 | Fri-2008-12-05 | True | Toronto Raptors | True | | 114 | 87 | 13 | 8 | 254 |
| 638 | 23 | Tue-2008-12-09 | False | Minnesota Timberwolves | True | | 99 | 96 | 14 | 9 | 254 |
| 644 | 28 | Fri-2008-12-19 | False | Detroit Pistons | True | 2OT | 120 | 114 | 17 | 11 | 254 |
| 651 | 33 | Mon-2008-12-29 | True | Philadelphia 76ers | True | | 112 | 95 | 19 | 14 | 337 |
| 653 | 35 | Mon-2009-01-05 | True | Golden State Warriors | True | | 119 | 114 | 20 | 15 | 254 |
| 654 | 36 | Wed-2009-01-07 | True | New Orleans Hornets | True | | 116 | 90 | 21 | 15 | 254 |
| 658 | 40 | Fri-2009-01-16 | False | Memphis Grizzlies | True | | 101 | 91 | 24 | 16 | 337 |
| 663 | 43 | Wed-2009-01-21 | False | Houston Rockets | True | | 99 | 108 | 25 | 18 | 254 |
| 670 | 47 | Fri-2009-01-30 | True | Oklahoma City Thunder | True | | 110 | 90 | 26 | 21 | 254 |
| 673 | 49 | Mon-2009-02-02 | True | Charlotte Bobcats | True | | 105 | 86 | 27 | 22 | 312 |
| 674 | 50 | Thu-2009-02-05 | True | Dallas Mavericks | True | | 115 | 87 | 28 | 22 | 355 |
| 678 | 53 | Wed-2009-02-11 | True | Los Angeles Lakers | True | | 113 | 109 | 30 | 23 | 254 |
| 684 | 57 | Mon-2009-02-23 | True | Atlanta Hawks | True | | 108 | 89 | 34 | 23 | 270 |
| 686 | 59 | Sat-2009-02-28 | True | Sacramento Kings | True | | 102 | 89 | 36 | 23 | 270 |
| 687 | 60 | Sun-2009-03-01 | False | Golden State Warriors | True | | 112 | 104 | 37 | 23 | 270 |
| 688 | 61 | Wed-2009-03-04 | True | Houston Rockets | True | | 101 | 94 | 38 | 23 | 270 |
| 691 | 64 | Tue-2009-03-10 | False | Indiana Pacers | True | | 112 | 100 | 41 | 23 | 270 |
| 693 | 65 | Wed-2009-03-11 | False | Atlanta Hawks | True | | 93 | 100 | 41 | 24 | 270 |
| 699 | 70 | Tue-2009-03-24 | True | Houston Rockets | True | | 99 | 86 | 44 | 26 | 270 |
| 708 | 77 | Sun-2009-04-05 | False | New Orleans Hornets | True | | 108 | 94 | 47 | 30 | 295 |
| 710 | 79 | Fri-2009-04-10 | False | San Antonio Spurs | True | | 99 | 105 | 47 | 32 | 295 |
| 711 | 80 | Sat-2009-04-11 | True | Golden State Warriors | True | | 108 | 118 | 47 | 33 | 270 |
| 712 | 81 | Mon-2009-04-13 | True | Los Angeles Clippers | True | | 106 | 85 | 48 | 33 | 404 |

*JazzGames   Figure 1*

200

| playerID | lineupID | <<< sorted by lineupID | playerID | lineupID | <<< sorted by playerID | |
|---|---|---|---|---|---|---|
| 10365 | 254 | | 10335 | 270 | | |
| 11744 | 254 | | 10335 | 281 | | |
| 11806 | 254 | | 10335 | 295 | | |
| 11822 | 254 | | 10335 | 404 | | |
| 11850 | 254 | | 10365 | 254 | | |
| 10335 | 270 | | 10365 | 270 | | |
| 10365 | 270 | | 10365 | 281 | | |
| 11744 | 270 | | 10365 | 295 | | |
| 11822 | 270 | | 10365 | 312 | | |
| 11850 | 270 | | 10365 | 337 | | |
| 10335 | 281 | | 10365 | 355 | | |
| 10365 | 281 | | 10365 | 404 | | |
| 11744 | 281 | | 10764 | 404 | | |
| 11822 | 281 | | 11238 | 295 | | |
| 11847 | 281 | | 11238 | 337 | | |
| 10335 | 295 | | 11415 | 355 | | |
| 10365 | 295 | | 11744 | 254 | | |
| 11238 | 295 | | 11744 | 270 | | |
| 11822 | 295 | | 11744 | 281 | | |
| 11850 | 295 | | 11744 | 312 | | |
| 10365 | 312 | | 11744 | 337 | | |
| 11744 | 312 | | 11806 | 254 | | <<< | |
| 11806 | 312 | | 11806 | 312 | | Paul Millsap |
| 11822 | 312 | | 11806 | 355 | | <<< |
| 11847 | 312 | | 11822 | 254 | | |
| 10365 | 337 | | 11822 | 270 | | |
| 11238 | 337 | | 11822 | 281 | | |
| 11744 | 337 | | 11822 | 295 | | |
| 11822 | 337 | | 11822 | 312 | | |
| 11850 | 337 | | 11822 | 337 | | |
| 10365 | 355 | | 11822 | 355 | | |
| 11415 | 355 | | 11822 | 404 | | |
| 11806 | 355 | | 11847 | 281 | | |
| 11822 | 355 | | 11847 | 312 | | |
| 11850 | 355 | | 11850 | 254 | | <<< |
| 10335 | 404 | | 11850 | 270 | | |
| 10365 | 404 | | 11850 | 295 | | |
| 10764 | 404 | | 11850 | 337 | | Deron Williams |
| 11822 | 404 | | 11850 | 355 | | |
| 11850 | 404 | | 11850 | 404 | | <<< |

JazzPlayerLineupXref
*Figure 2*

| | name | abbrev-name | jersey | pos | height | weight | birthdate | nba-experience | college |
|---|---|---|---|---|---|---|---|---|---|
| 10335 | Carlos Boozer | C. Boozer | 5 | F-C | 6'9" | 258 | 1981-11-20 | 6 | Duke University |
| 10365 | Ronnie Brewer | R. Brewer | 9 | G-F | 6'7" | 220 | 1985-03-20 | 2 | University of Arkansas |
| 10764 | Matt Harpring | M. Harpring | 15 | F | 6'7" | 231 | 1976-05-31 | 10 | Georgia Institute of Technology |
| 11238 | Andrei Kirilenko | A. Kirilenko | 47 | F | 6'9" | 220 | 1981-02-18 | 7 | |
| 11415 | Kyle Korver | K. Korver | 26 | F | 6'7" | 210 | 1981-03-17 | 5 | Creighton University |
| 11744 | C.J. Miles | C. Miles | 34 | G | 6'6" | 210 | 1987-04-18 | 3 | |
| 11806 | Paul Millsap | P. Millsap | 24 | F | 6'8" | 245 | 1985-02-10 | 2 | Louisiana Tech University |
| 11822 | Mehmet Okur | M. Okur | 13 | F-C | 6'11" | 249 | 1979-05-26 | 6 | |
| 11847 | Ronnie Price | R. Price | 17 | G | 6'2" | 190 | 1983-06-21 | 3 | Utah Valley State College |
| 11850 | Deron Williams | D. Williams | 8 | G | 6'3" | 210 | 1984-06-26 | 3 | University of Illinois at Urbana-Champaign |

*JazzRoster*
*Figure 3*

400

| starting-lineup | xml-ptr |
|---|---|
| 254 | pointer>> |
| 270 | ... |
| 281 | |
| 295 | |
| 312 | |
| 337 | |
| 355 | |
| 404 | |

*Figure 4* pointer>>

500 {
```
<starting-lineup>
  <player>Ronnie Brewer</player>
  <player>C.J. Miles</player>
  <player>Paul Millsap</player>
  <player>Mehmet Okur</player>
  <player>Deron Williams</player>
</starting-lineup>
``` pointer2>>
  Index patterns:
    ronnie, brewer, cj, miles, paul, millsap,
    mehmet, okur, deron, williams, etc.

pointer3>>
  Index patterns:
    "Ronnie Brewer", "C.J. Miles", "Paul Millsap",
    "Mehmet Okur", and "Deron Williams"

pointer4>>
  Index patterns:
    Ronnie near Brewer, C.J. near Miles, Paul near Millsap,
Mehmet near Okur, and Deron near Williams pointer5>>
  Index patterns:
    40b8636cf497235c, 100519ba181728d8,
    f9d6824a13b3ed25, b249f6d0e2e948fc, ec45e8c4c06bed36

MULTISTAGE PIPELINE FOR FEEDING JOINED TABLES TO A SEARCH SYSTEM

CROSS-REFERENCE TO RELATED APPLICATIONS

This application is a continuation of U.S. application Ser. No. 13/029,977, filed Feb. 17, 2011, titled "MULTISTAGE PIPELINE FOR FEEDING JOINED TABLES TO A SEARCH SYSTEM" now U.S. Pat. No. 8,190,597 issued on May 29, 2012, which is a continuation of U.S. application Ser. No. 12/974,915, filed Dec. 21, 2010, titled "MULTISTAGE PIPELINE FOR FEEDING JOINED TABLES TO A SEARCH SYSTEM" which claims priority to U.S. Provisional Application 61/288,776, filed Dec. 21, 2009, titled "MULTISTAGE PIPELINE FOR FEEDING JOINED TABLES TO A SEARCH SYSTEM", all of which are incorporated herein by reference in their entireties.

BACKGROUND

Background and Relevant Art

Computers and computing systems have affected nearly every aspect of modern living. Computers are generally involved in work, recreation, healthcare, transportation, entertainment, household management, etc.

Information in relational databases is stored across multiple tables with various "one to many" or "many to many" relationships between tables represented by indexed local and foreign keys. A single specific query involving multiple tables or joining all tables together to feed into a separate search system is often so computation intensive as to significantly slow down the database query dramatically. Exporting such databases to a search system for most efficient and relevant search operations often involves full database joins that my require a huge system overhead or even go off into an exponentially increasingly complicated calculation and never come back.

However, advanced enterprise search systems work optimally when information on a given hit has been collected from appropriate related database tables into a single document.

In typical relational databases the normal form for data records avoids embedding hierarchies of multiple child items which associate with a parent item because of the storage redundancy and the difficulties in updating multiple records when a child item is altered. Instead the hierarchy is discovered via a "join" operation which discovers the linkage based on a parent reference within each child record. When records are linked in a many-to-many relationship, the database contains an "association" table of linkage records defining each linked pair of records. Normal form and the association tables facilitate efficient updates to the database.

However, when data items need to be found quickly via an indexed search, there is no quick method of discovering which of the various hit candidates from one table are linked to other hit candidates from another table. A join operation has to be run across candidate collections, which is slow because each of the candidate records has to be read to discover the linkage. It is only the linked records whose constituents meet the search criteria that are the answers to the query. The join problem is this: it takes a long time to read all the candidate data records to discover the linkage. Only a subset of the candidates will make it into the answer set, and excess record reads occur to discover them.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method that may be practiced in a computing environment. The method includes acts for flattening a relational database into one or more hierarchical record documents. The method includes accessing a first database table. A first entry value is identified in a first entry from the first database table. The first entry value represents a plurality of entry values of corresponding entries in a second database table. The method further includes creating an array. The array includes one or more representations of the plurality of entry values. The method further includes converting at least a portion of the first database table to one or more hierarchical record documents, with columns of the first database table represented at a first hierarchical level and values in entries in the columns represented at a second hierarchical level below the first hierarchical level for a corresponding column. The first database table includes a plurality of entries having the first entry value. Converting the first database table to one or more hierarchical record documents includes substituting the array in a hierarchical record document for each entry in the plurality of entries having the first entry value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1 illustrates an example database table.

DETAILED DESCRIPTION

Embodiments may include efficient approaches to create a composite record that a search system can quickly search and rank. Some embodiments may create a page like structure from relational database entries that allows the page like structure to be indexed and searched using traditional search engine tools. The addition of this approach to an enterprise search system facilitates the mixture of database and full text searching on documents, databases, or mixtures of each and allows database records to be transformed into appropriate search records that the system can efficiently process.

Reference is now made to the figures, which include a number of tables in a sample database application. The sample database is implemented for searching for games of the Utah Jazz NBA team and can be used to show various aspects of various embodiments.

Figure 3:
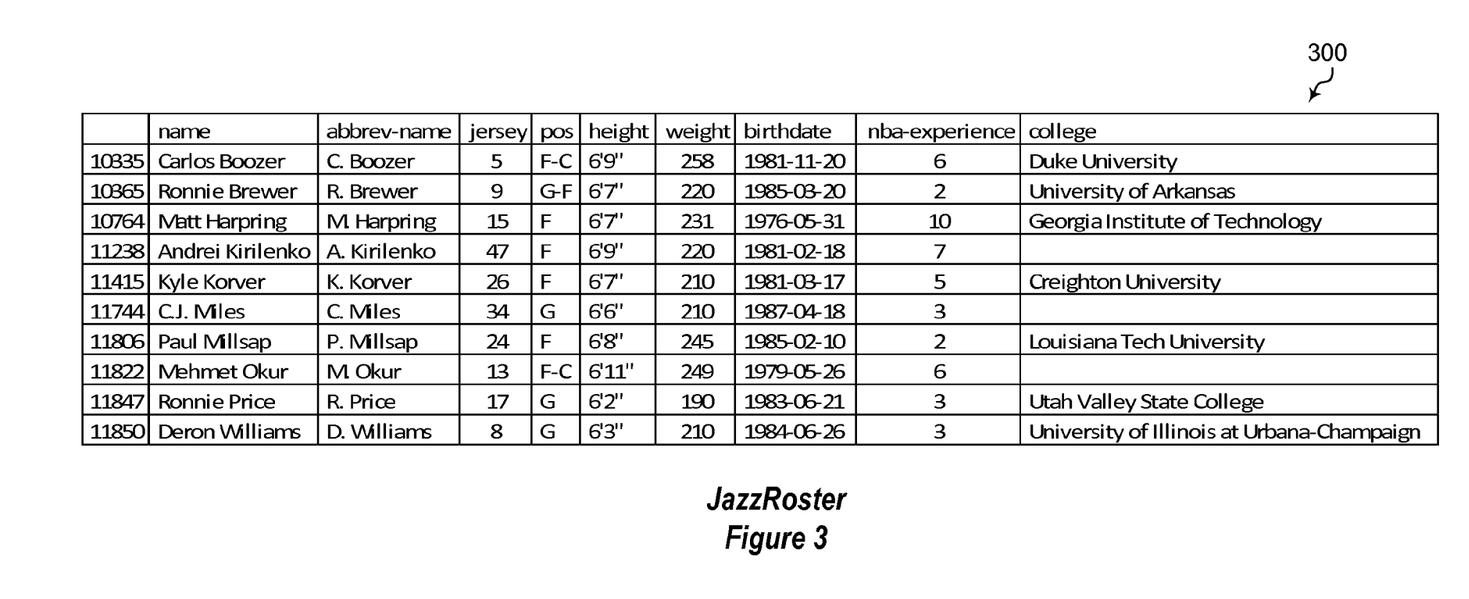
FIG. 3 illustrates another example database table.

Referring now to FIG. 1, a table 100 of a database is illustrated. Table 100 is the scheduled games table, named "JazzGames". This table 100 contains entries for a selection of 30 games from the 2008-2009 season. Each game entry contains a column for the starting lineup number, which identifies the group of players that started that game. FIG. 3 includes a table 300, entitled "JazzRoster" which shows the roster of players and data about them. Players in the table 300 appear in at least one starting lineup. Other players that did not start are not listed.

The starting lineup relationship to the games involves a many to many relationship which often causes difficulties for join operations. Each game shown in the table 100 has a lineup number that links to five players. Each of the players link to one or more starting lineup numbers. A player/lineup cross reference table 200, Illustrated in FIG. 2 and titled "JazzPlayerLineupXref" has rows that cross reference players to starting lineup IDs. Table 200 include two sortings, one sorted by lineupID and one sorted by playerID. A typical search might be structured as follows: Find the games where Paul Millsap and Deron Williams started for the Jazz against the Lakers in February. Ordinarily, the search would involve the following operations:
1. Search the JazzGames table for the games where the opponent is the Lakers, as the third word entry in the opponent field ("Los Angeles Lakers") for one row #20, game number 53. The is one game in February satisfying the query as well.
2. Search the JazzRoster table to get the PlayerIDs for Paul Milsap (11806) and Deron Williams (11850)
3. Use those PlayerIDs to search the JazzPlayerLineupXref table for LineupIDs where both Paul Millsap (254, 312, 355) and Deron Williams (254, 270, 295, 337, 355, 404) are in the same LineupIDs (254, 355), a Boolean AND operation.
4. Use those LineupIDs to filter the search on the JazzGame table, limiting lineupIDs to (254 and 355), resulting in gameID 53 as the final answer since the lineupID is 254 and it satisfied the JazzGame table search for "Lakers" and "February" search.

This query might be further complicated by various ranked search techniques. For example:
(1) The search for "Lakers" might get an exact hit but "Lakes" would fail on the exact hit and get a positive result on a stemmed hit.
(2) The search for "Lakers in January" might fail but the nearby month of "February" would succeed.
(3) The search for "Darrin Williams" would fail but the alternate name spelling "Daren" would succeed.
(4) The search for "Paul Milzap" might fail but a phonetic version of "Milzap" would succeed.
(5) The search for both players together might not give enough hits so the search set is expanded by searching for each player individually.

Making a Composite Record

One way to prepare for these searches is to form a composite record. Full featured search systems can perform especially well if all of the data for a hit can be limited to retrieving individual records instead of having to dynamically span across related database tables. If the game number=53 record were an xml record as follows, it could easily satisfy the above query. It would use either multiple searches to satisfy the listed less relevant non-exact searches or the hits being processed by relevance algorithms to show their ranked order from a single large search where the hits bubble to their appropriate place in a specified ranked ordering.

```
<game ID="00678">
    <number>53</number>
    <date>Wed-2009-02-11</date>
    <home>True</home>
    <opponent>Los Angeles Lakers</opponent>
    <win>True</win>
    <team-score>113</team-score>
    <opp-score>109</opp-score>
    <wins>30</wins>
    <losses>23</losses>
    <starting-lineup>
        <player>Ronnie Brewer</player>
        <player>C.J. Miles</player>
        <player>Paul Millsap</player>
        <player>Mehmet Okur</player>
        <player>Deron Williams</player>
    </starting-lineup>
</game>
```

Note that everything may not reasonably be answerable in a composite record that can be answered with careful processing of the relational database with all of its linked tables and the structural links between tables. A query might be able to find a starting lineup that results in a winning record for those games where this lineup started of 75% or higher. To put all of the starting lineup's information in each record that has that lineup would make the composite table more complex and illustrates the reason where a hierarchal xml-type record might be much more difficult to keep up to date and complete compared with a relational database model.

Long lists of many to many linkages between tables is especially difficult to join together efficiently to create these composite records to load into a search system. The first implementation of some embodiments uses indexed links to allow for rapid join operations of this composite record.

An example is now illustrated. A table is selected that will be the table to which all other information will be attached in the composite record. In this case, embodiments may be searching for the actual scheduled and played NBA games as the key table, as illustrated by the JazzGames table 100 illustrated in FIG. 1. The size of the table 100 will be the same as before the join. When many sub records are retrieved for other tables, they are inserted hierarchally into a composite record, making it a non-relational record.

Figure 2:
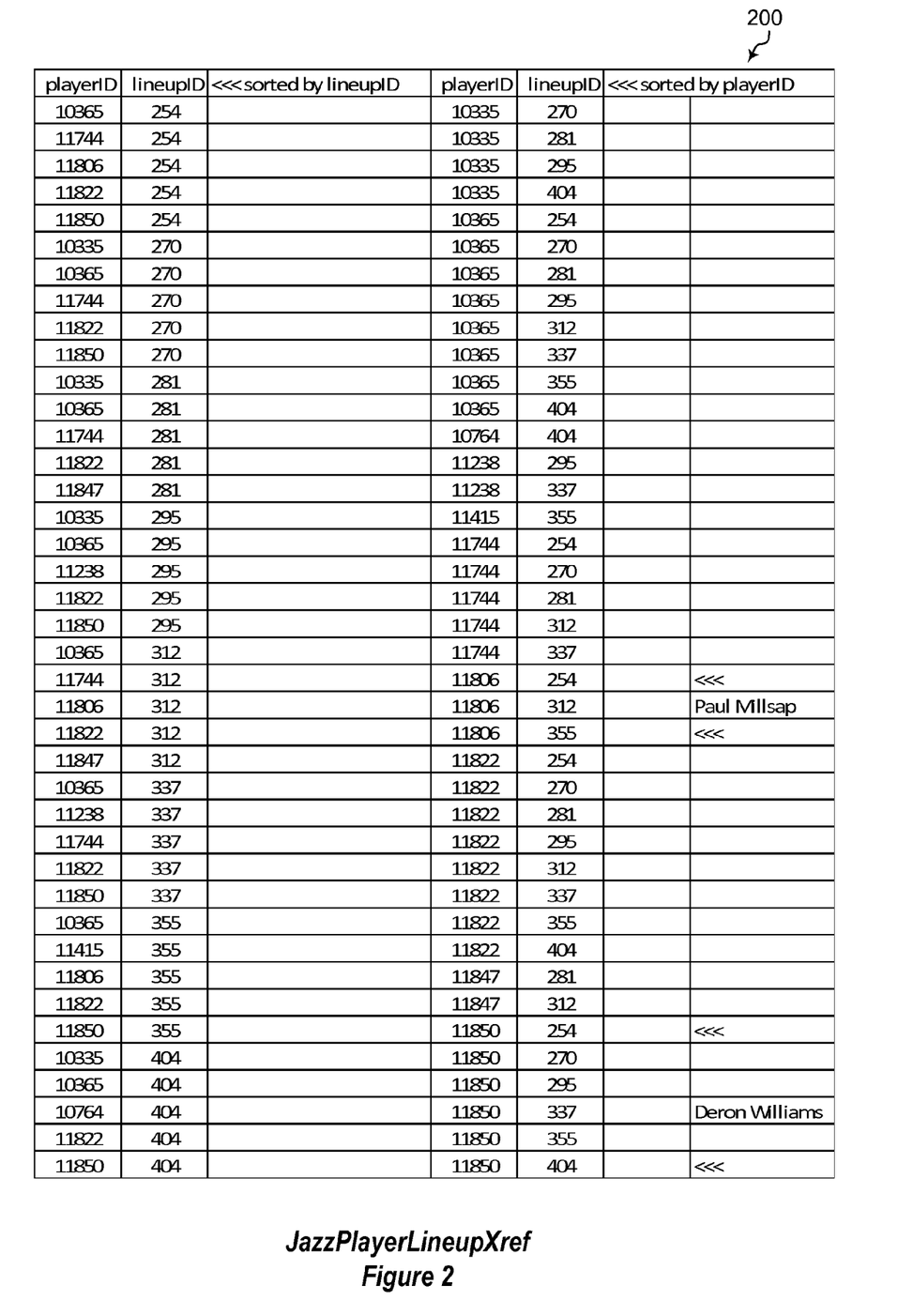
FIG. 2 illustrates another example database table.

First, the keys with the many to many relationships are preprocessed to create directly accessed records ready for insertion into the hierarchical composite record. In this case, the JazzPlayerLineupXref table 200 is indexed and sorted by the lineupID field so the five starting player numbers can be quickly accessed. Accessing the five starting players' numbers allows the five starting players' names to be added to the composite record.

Figure 4:
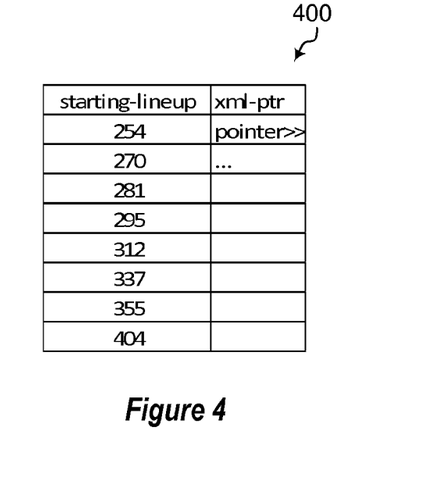
FIG. 4 illustrates an example database table correlating entries to arrays using pointers.

Embodiments may loop through the JazzPlayerLineupXref table 200, creating xml for each unique lineupID. For starting-lineup 254, players #10365, 11744, 11806, 11822 and 11850 are accessed in the JazzRoster table 300 illustrated in FIG. 3. PlayerID is a key for this table. The five numbers are looked up in the JazzRoster table 300, giving Ronnie Brewer, C J Miles, Paul Millsap, Mehmet Okur and Deron Willliams to be put into an xml snippet 500 illustrated as in FIG. 5, where the snippet 500 is a data array among a set of data arrays. The snippet 500 is created and persisted such that it is ready for insertion into the composite record where appropriate. In particular, this snippet 500 can be stored and used whenever the lineupID 254 is encountered when flattening out a relational database. FIG. 4 includes table 400, "JazzStartingLineups" table 400, which may be a temporary table to accelerate creation of the composite record. In the example illustrated, the table 400 has its first data row indexed by starting-lineup #254 to contain the xml snippet. While not illustrated in the figures, typically one or more snippets would be created for all of the lineups. The table could be as simple as the starting-lineup and the xml pointer to the xml string as illustrated in FIG. 4.

The JazzGames table 100 can be iterated through to create the composite records. The first record is accessed and the xml snipped retrieved or generated. The pregenerated xml record for starting-lineup #254 is retrieved. And the two records are combined into a composite record. For example:

```
<game-starting-lineup>
    <game ID="00627">
        <number>16</number>
        <date>2008-11-26-Wed</date>
        <home>True</home>
        <opponent>Memphis Grizzlies</opponent>
        <win>True</win>
        <team-score>117</team-score>
        <opp-score>100</opp-score>
        <wins>10</wins>
        <losses>6</losses>
        <starting-lineup>00254</starting-lineup>
    </game>
    <starting-lineup>
        <player>Ronnie Brewer</player>
        <player>C.J. Miles</player>
        <player>Paul Millsap</player>
        <player>Mehmet Okur</player>
        <player>Deron Williams</player>
    </starting-lineup>
</game-starting-lineup>
```

The record could be a more complex composite. More merged sections could be derived in a similar fashion to this starting lineup. In each instance, instead of creating expanded rows of tables, embodiments simply have the result of the one to many linkage for each row ready for merging into the final xml hierarchal representation.

This becomes particularly useful as the many to many variables rise to extreme levels. For example, if a database with 10,000,000 records is linked to 10,000 other records in 100,000 different combinations through one or more other tables, depending on the record, embodiments may prepare the list of the key record variable ready to merge with each of the 10,000,000 records. Other approaches to the problem can involve exploding the 10,000,000 rows to perhaps even billions of rows to computationally join the tables together.

Returning once again to the example at hand, the composite record is now ready to be fed into a search system, be indexed and ready for retrievals, both exact retrievals and ranked relevance based retrievals.

The search system may create indexing patterns from the content of the composite record. If, in addition to xml snippets, embodiments preprocessed them into pattern lists, then instead of creating a perhaps very large and unwieldy composite record database, embodiments could apply the indexing process directly to each part of the composite record and send the pattern list to the indexer. This would send patterns like "denver, nuggets, wed, 2008, 2008-10, 2008-10-29, . . ." from the game record and add in patterns like "ronnie, brewer, cj, miles, paul, millsap, mehmet, okur, deron, williams, . . ." from the pregenerated starting-lineup addition for lineup #254. The patterns can also be pregenerated and ready for each game that needs that lineup. The index reference in the searching index may be the record id or row number of the game table. This approach would enable direct indexing from the database itself which would facilitate keeping the database and search index in synch and avoiding the possible huge overhead of separate composite records. The search index still will be as extensive as needed to deal with the data fields, full text fields and the various approaches to fuzzy searches and relevance ranking. Full text indexing systems are typically designed to handle a greater volume of search text and fields than would be typical in a database index.

The following now illustrates three more generalized versions of the preceding.

Composites

When database records logically form a hierarchical structure via the join linkage tables, a "primary" table can be defined whose records can be modeled as root nodes of sub-trees that are defined by the linkage. Starting at the root node, the sub-tree can be traversed and the data from the child nodes can be gathered into a "flattened" equivalent composite record. Composite records would then become the targets for searching. Composite records are thus equivalent to "documents" in an already established, document search system. Thus, existing document indexing and searching tools can be used.

Raw Data Composites

Raw data composites can be created by a series of data base joins. For each record, the data of interest is extracted then put into a row. Then for each link to a record, those data elements are concatenated to the row. If each joined record further joins another record of interest, then the elements from those records are further concatenated to the row. In this manner, the hierarchy tree underneath the originating record is flattened into a single row. The contents of the row can then be indexed. The composite row would be the "document" that would be referenced from the index.

Figure 5:
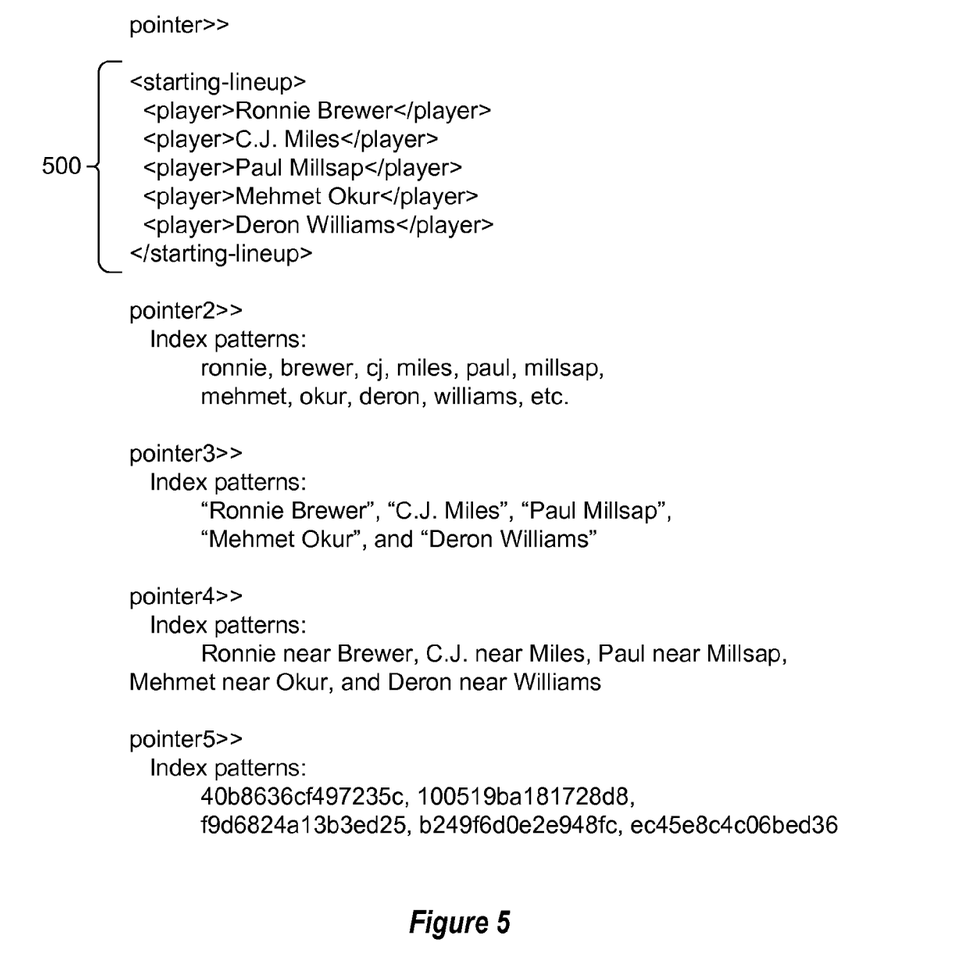
FIG. 5 illustrates data arrays.

Such an approach could be cumbersome, especially if multiple sub joins were redundantly regenerated. Acceleration schemes (similar to the use of the snippet 500 illustrated above) could store partial rows of sub joins to be re-used when reencountered. Acceleration structures can either be custom coded for each particular problem, or appropriate intermediate tables can be generated from the database via SQL.

Hash Values Composites

Hash value composites are comprised of the hash values of the extracted data elements instead of the data elements themselves. In some embodiments, prior to any joining operation, each row from a table that has data attributes is converted to a list of hash values constructed from the tag:value strings, where tag is the name of the column and value is the data in the cell. Cells designated as free text would have the appropriate collection of hash values generated to support the free text queries.

After all attribute data for each table are converted to sets of hash values, the join sequence is executed. As embodiments traverse the sub-tree representing the hierarchical structure associated with the record embodiments concatenate hash values instead of raw data elements. The resulting composite list of hash values would be sorted to become the record that is passed into an indexing system. This may be especially useful for indexing systems that index hashes as opposed to, or in addition to, full text indexing. Such a system is illustrated in U.S. patent application Ser. No. 12/281,252 titled Hyperspace Index, filed on Mar. 2, 2007, which is incorporated herein by reference in its entirety.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Figure 6:
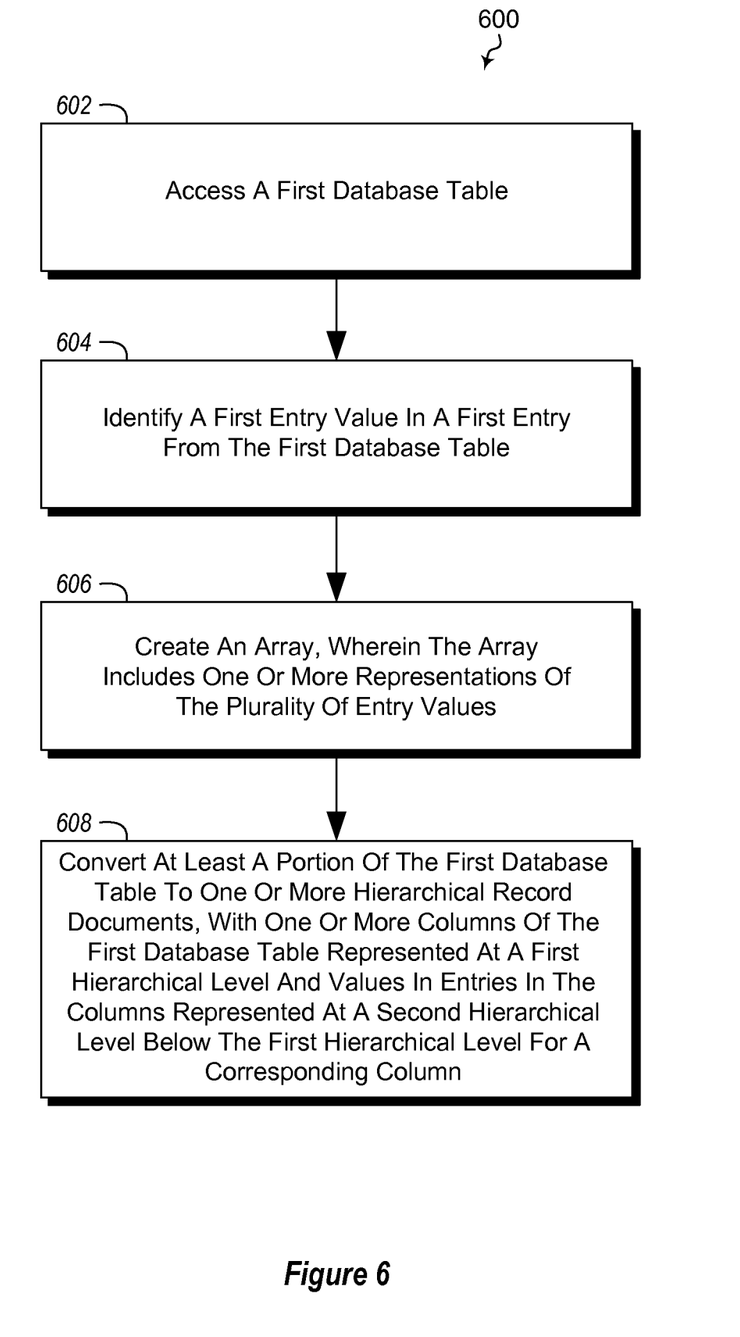
FIG. 6 illustrates a method of flattening portions of a relation database.

One embodiment may be practiced in a computing environment and includes a method 600 with acts for flattening a relational database into one or more hierarchical record documents. The method 600 includes accessing a first database table (act 602). For example, the JazzGames table may be accessed.

The method 600 further includes identifying a first entry value in a first entry from the first database table (act 604). The first entry value represents a plurality of entry values of corresponding entries in a second database table. For example, the entry value "254" may be identified in the starting lineup column of the JazzGames table. The entry value "254" represents the set of playerIDs 10365, 11744, 11806, 11822, and 11850 or the player names Ronnie Brewer, C. J. Miles, Paul Millsap, Mehmet Okur, and Deron Williams from the JazzRoster table. This link is made using the JassPlayerLineupXref table.

The method 600 further includes creating an array, wherein the array includes one or more representations of the plurality of entry values (act 606). For example, the array may be one of the snippets illustrated below the JazzStartingLinups table in Appendix A.

The method 600 further includes converting at least a portion the first database table to one or more hierarchical record documents, with one or more columns of the first database table represented at a first hierarchical level and values in entries in the columns represented at a second hierarchical level below the first hierarchical level for a corresponding column (act 608). The first database table includes a plurality of entries having the first entry value. Converting the first database table to a hierarchical record document includes substituting the array in the one or more hierarchical record documents for each entry in the plurality of entries having the first entry value.

For example hierarchical record documents may be created for each game in the JazzGames table. Note that the games with gameID 627, 635, 636, 638, 644, 653, 654, 663, 670, and 678 all have the starting lineup 254. Thus when creating each of those hierarchical record documents, 254 is simply substituted for the array illustrated by the snippet illustrated in Appendix A under Table 4. Thus, the data does not need to be recreated each time when flattening out the database table JazzGames.

The method may be practiced where the array is pointed to by a pointer. Substituting the array in a hierarchical record document for each entry in the plurality of entries having the first entry value may include following the pointer to obtain the array.

The method may be practiced where the one or more representations of the plurality of entry values are index entities used to index the plurality of entry values such that the hierarchical record document comprises an internal index of the second database table for the plurality of entry values. The pointers to pointer2, pointer3, pointer4, and pointer5 illustrated below table 4 illustrate an example of this. In particular, rather than substituting actual data, one or more index entries can be substituted. For example the index entities may include phrase index representations representing the plurality of entry values as phrases. For example, the array may include "Ronnie Brewer", "C. J. Miles", "Paul Millsap", "Mehmet Okur", and "Deron Williams" as phrases rather than Ronnie Brewer, C. J. Miles, Paul Millsap, Mehmet Okur, and Deron Williams, as illustrated by pointer3.

Alternatively or additionally, the index entities may include phonetic index representations where the plurality of entry values are represented by phonetic representations of the plurality of entry values. For example, phonetic representations of Ronnie Brewer, C. J. Miles, Paul Millsap, Mehmet Okur, and Deron Williams may be included in the array.

Alternatively or additionally, the index entities may include word proximity index representations for the plurality of entry values. For example, Ronnie near Brewer, C. J. near Miles, Paul near Millsap, Mehmet near Okur, and Deron near Williams may be included in the array, as illustrated by pointer 3. Proximity may be in either order. For example Ronnie near Brewer is functionally the same as Brewer near Ronnie.

Alternatively or additionally, the index entities may include hash index representations, where the plurality of entry values are represented by corresponding hash values of the plurality of entry values. For example, a hash value may be created for each of Ronnie Brewer, C. J. Miles, Paul Millsap, Mehmet Okur, and Deron Williams as illustrated by pointer5. Examples of such indexing techniques are illustrated in U.S. patent application Ser. No. 12/281,252 titled Hyperspace Index, filed on Mar. 2, 2007, which is incorporated herein by reference in its entirety. The hash values may then be included in the array.

Other indexing techniques, though not specifically enumerated may be used when creating the array.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of flattening at least a portion of a relational database into one or more hierarchical record documents, the method comprising:
    accessing a first database table;
    identifying a first entry value in a first entry from the first database table, wherein the first entry value represents a plurality of entry values of corresponding entries in a second database table;
    creating an array, wherein the array includes one or more representations of the plurality of entry values;
    converting at least a portion of the first database table to one or more hierarchical record documents, with columns of the first database table represented at a first hierarchical level and values in entries in the columns represented at a second hierarchical level below the first hierarchical level for a corresponding column, wherein the first database table comprises a plurality of entries having the first entry value, and wherein converting the first database table to one or more hierarchical record documents comprises substituting the array in a hierarchical record document for each entry in the plurality of entries having the first entry value, wherein at least one hierarchical record document comprises an internal index of the second database table for the plurality of entry values, wherein the array is pointed to by a pointer, and wherein substituting the array in a hierarchical record document for each entry in the plurality of entries having the first entry value comprise following the pointer to obtain the array.

2. The method of claim 1, wherein the one or more representations of the plurality of entry values are index entities used to index the plurality of entry values such that a hierarchical record document comprises an internal index of the second database table for the plurality of entry values.

3. The method of claim 2, wherein the index entities comprise phrase index representations representing the plurality of entry values as phrases.

4. The method of claim 2, wherein the index entities comprise phonetic index representations where the plurality of entry values are represented by phonetic representations of the plurality of entry values.

5. The method of claim 2, wherein the index entities comprise word proximity index representations for the plurality of entry values.

6. The method of claim 2, wherein the index entities comprise hash index representations, where the plurality of entry values are represented by corresponding hash values of the plurality of entry values.

7. In a computing environment, one or more physical non-transitory computer readable media comprising computer executable instructions that when executed by one or more processors performs the following:
    accessing a first database table;
    identifying a first entry value in a first entry from the first database table, wherein the first entry value represents a plurality of entry values of corresponding entries in a second database table;
    creating an array, wherein the array includes one or more representations of the plurality of entry values;

converting at least a portion of the first database table to one or more hierarchical record documents, with columns of the first database table represented at a first hierarchical level and values in entries in the columns represented at a second hierarchical level below the first hierarchical level for a corresponding column, wherein the first database table comprises a plurality of entries having the first entry value, and wherein converting the first database table to one or more hierarchical record documents comprises substituting the array in a hierarchical record document for each entry in the plurality of entries having the first entry value, wherein at least one hierarchical record document comprises an internal index of the second database table for the plurality of entry values, wherein the array is pointed to by a pointer, and wherein substituting the array in a hierarchical record document for each entry in the plurality of entries having the first entry value comprise following the pointer to obtain the array.

8. The non-transitory computer readable media of claim 7, wherein the one or more representations of the plurality of entry values are index entities used to index the plurality of entry values such that a hierarchical record document comprises an internal index of the second database table for the plurality of entry values.

9. The non-transitory computer readable media of claim 8, wherein the index entities comprise phrase index representations representing the plurality of entry values as phrases.

10. The non-transitory computer readable media of claim 8, wherein the index entities comprise phonetic index representations where the plurality of entry values are represented by phonetic representations of the plurality of entry values.

11. The non-transitory computer readable media of claim 8, wherein the index entities comprise word proximity index representations for the plurality of entry values.

12. The non-transitory computer readable media of claim 8, wherein the index entities comprise hash index representations, where the plurality of entry values are represented by corresponding hash values of the plurality of entry values.

13. In a computing environment, a computing system for flattening at least a portion of a relational database into one or more hierarchical record documents, the computing system comprising:
one or more computer processors;
one or more physical computer readable media coupled to the one or more computer processors, wherein the one or more physical media comprise computer executable instructions that when executed by one or more of the one or more computer processors cause one or more of the one or more computer processors to perform the following:
accessing a first database table;
identifying a first entry value in a first entry from the first database table, wherein the first entry value represents a plurality of entry values of corresponding entries in a second database table;
creating an array, wherein the array includes one or more representations of the plurality of entry values;
converting at least a portion of the first database table to one or more hierarchical record documents, with columns of the first database table represented at a first hierarchical level and values in entries in the columns represented at a second hierarchical level below the first hierarchical level for a corresponding column, wherein the first database table comprises a plurality of entries having the first entry value, and wherein converting the first database table to one or more hierarchical record documents comprises substituting the array in a hierarchical record document for each entry in the plurality of entries having the first entry value, wherein at least one hierarchical record document comprises an internal index of the second database table for the plurality of entry values, wherein the array is pointed to by a pointer, and wherein substituting the array in a hierarchical record document for each entry in the plurality of entries having the first entry value comprise following the pointer to obtain the array.

14. The computing system of claim 13, wherein the one or more representations of the plurality of entry values are index entities used to index the plurality of entry values such that a hierarchical record document comprises an internal index of the second database table for the plurality of entry values.

15. The computing system of claim 14, wherein the index entities comprise phrase index representations representing the plurality of entry values as phrases.

16. The computing system of claim 14, wherein the index entities comprise phonetic index representations where the plurality of entry values are represented by phonetic representations of the plurality of entry values.

17. The computing system of claim 14, wherein the index entities comprise word proximity index representations for the plurality of entry values.

* * * * *